Nov. 8, 1960
R. C. DREIER
2,959,203
SAW STRUCTURE
Filed Nov. 10, 1959
2 Sheets-Sheet 1
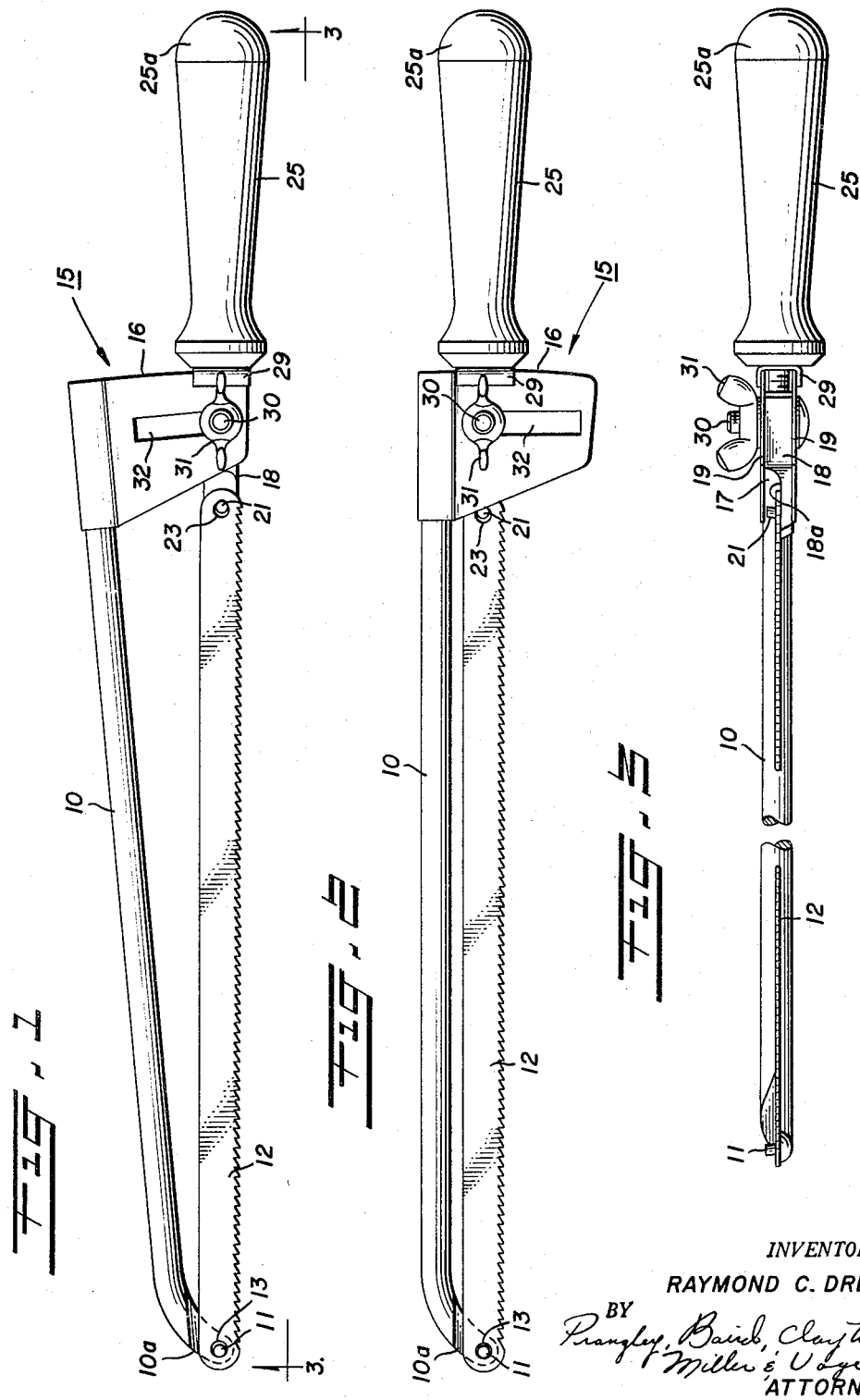
INVENTOR.
RAYMOND C. DREIER
BY
ATTORNEYS

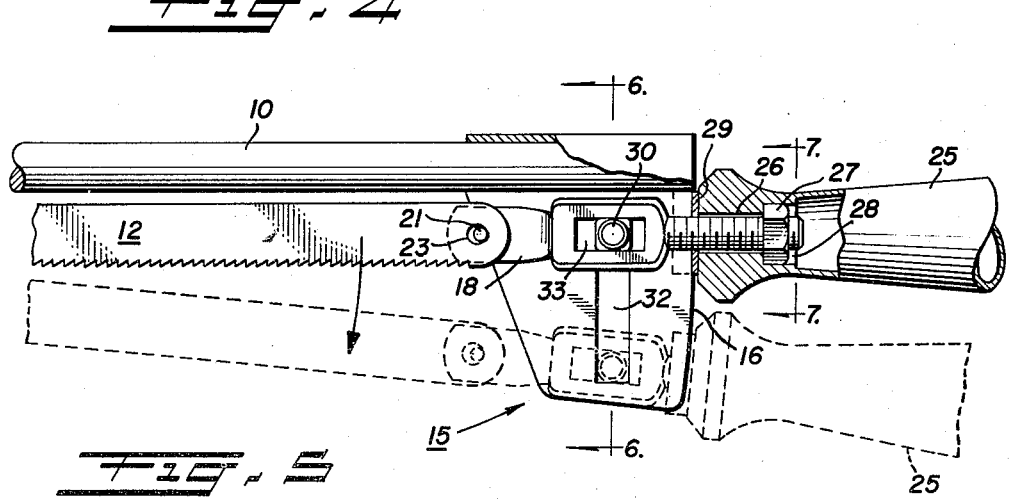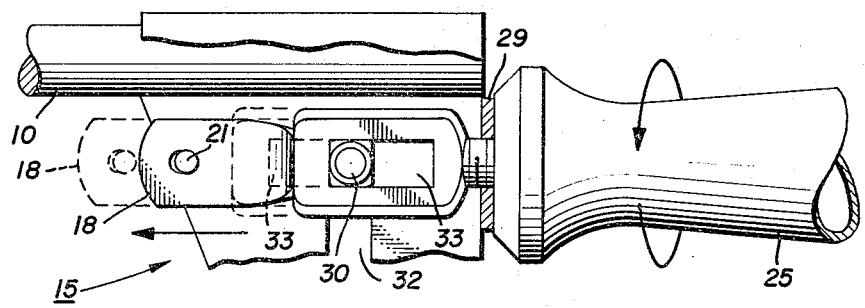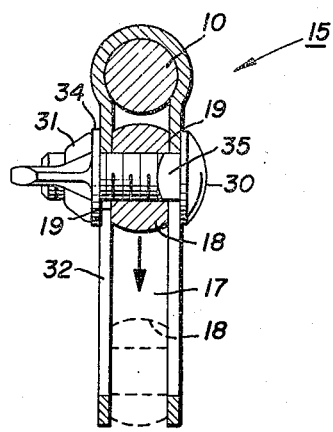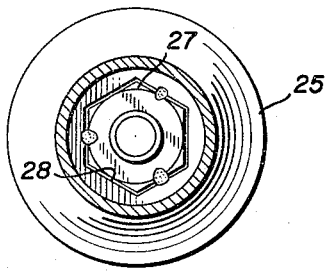

United States Patent Office 2,959,203
Patented Nov. 8, 1960

2,959,203

SAW STRUCTURE

Raymond C. Dreier, 6930 South Shore Drive, Chicago, Ill.

Filed Nov. 10, 1959, Ser. No. 852,111

8 Claims. (Cl. 145—33)

This invention relates to a hack saw, and more particularly to a hack saw in which the blade thereof is adjustably positioned with respect to the frame or backbone of the saw. It is an object of the invention to provide an improved device of this character.

In conventional hack saws, the blade is arranged substantially parallel to the frame and is spaced a substantial distance therefrom whereby relatively bulky objects may be sawed through without interference by the frame. A hack saw of this type cannot, however, be employed within a confined space or opening.

Various forms of hack saws are known in the art in which the hack saw blade is adjustably positioned with respect to the frame. Such saws permit the blade to be positioned closely adjacent the frame whereby the saw may be used in a confined space, and permit the blade to be positioned away from the frame such that clearance is provided between the blade and the frame to permit the sawing of bulky objects. Preferably, such a hack saw permits positioning of the blade intermediate its extreme positions, for maximum adaptability of the saw. Many previously known hack saws of this adjustable type have been difficult to adjust and/or have been susceptible to slipping of the blade from its adjusted position toward the frame of the saw as a result of the pressure of the work piece against the blade. In some prior art hack saws of this adjustable type, the tensioning of the blade has been affected by the locking of the blade in adjusted position. These, and other disadvantageous characteristics of previously known adjustable hack saws have resulted in a considerable amount of experimenting and developmental work, none of which has previously produced an adjustable hack saw which is satisfactory on all counts.

An adjustable hack saw constructed in accordance with the present invention provides for quick and easy adjustment of the position of the hack saw blade with respect to the frame anywhere between its extreme positions. The blade is firmly locked in adjusted position without in any way affecting the tensioning of the blade.

Accordingly, it is another object of the invention to provide an improved hack saw in which the blade is quickly and easily adjusted in position with respect to the frame thereof.

It is a further object of the invention to provide an improved hack saw in which the blade may be firmly locked in adjusted position with respect to the frame thereof.

It is a still further object of the invention to provide an improved adjustable hack saw in which the locking of the blade in adjusted position with respect to the frame thereof does not alter the tensioning of the blade.

Another object of the invention is to provide an improved adjustable hack saw having various of the characteristics specified above while being durable, convenient to use and economical to manufacture.

Further features of the invention pertain to the particular arrangement of the elements of the adjustable hack saw, whereby the above outlined and additional features thereof are attained.

The invention, both as to its organization and method of operation, together with further objects and advantages thereof, will best be understood by reference to the following specification, taken in connection with the accompanying drawings, in which:

Figure 1 is a side elevational view of an adjustable hack saw illustrating one embodiment of the invention;

Fig. 2 is a similar view of the same hack saw in a different position of adjustment;

Fig. 3 is a bottom plan view of the same hack saw, partially broken away;

Fig. 4 is an enlarged, partial side-elevational view, partially broken away, of the handle end of the same hack saw;

Fig. 5 is a view similar to Fig. 4 but illustrating the manner of tightening and loosening the saw blade;

Fig. 6 is a cross-sectional view taken in the direction of the arrows along the line 6—6 of Fig. 4; and Fig. 7 is an enlarged, cross-sectional view taken in the direction of the arrows along the line 7—7 of Fig. 4.

The hack saw illustrated in the drawings includes a back bone or frame 10 which is preferably in the form of a heavy rod. The left hand end of the frame member 10, as viewed in Figs. 1 and 2, is bent downwardly and has a flattened area 10a. A pin 11 is set into this flattened portion of the frame member 10 and is cocked forwardly or to the left such that a hack saw blade 12, having an opening 13, may be hooked thereover and will tend to remain flat against the surface 10a when it is subjected to tension, all as is common in the art.

At the right hand end of the frame member 10 an arm 15 extends laterally therefrom. This arm is preferably in the form of a U-shaped member of heavy sheet metal, the bail of the arm being arranged over and spot welded to the frame member 10, and the arms thereof extending downwardly in parallel spaced-apart relationship. The surface 16 of the arm 15 which faces away from the pin 11 is preferably arcuate, extending generally circumferentially about the pin 11. In the illustrated embodiment of the invention this surface 16 consists of the edges of the arms of the U-shaped sheet metal member which comprises the arm 15.

The space defined by and between the legs of the U-shaped arm 15 constitutes a slot 17 which receives a blade anchoring member 18. The main body of the anchoring member 18 has flat sides 19, as best illustrated in Fig. 6, whereby it is prevented from rotation within the slot 17. The left hand end of the member 18 is cut away, as best shown in Fig. 3, to provide a flat surface 18a which lies parallel to the surfaces 19 and is arranged half way therebetween. A pin 21 is set into this left hand portion of the anchor member 18 and protrudes outwardly from the surface 18a and tilts to the right such that the hack saw blade 12, having a second opening 23, may be hooked thereover and will tend to remain flat against the surface 18a when it is subjected to tension. It will be noted by reference to Fig. 3 that the blade 12 is thereby made to lie in a plane which extends through the longitudinal axis of the rod-like frame member 10.

The right hand end of the anchor member 18 is threaded and extends beyond the arcuate surface 16 of the arm 15. A handle 25 is provided which is adapted to bear against the arcuate surface 16 of the arm 15 and draw on the threaded end of the anchor member 18 to tension the blade 12. The handle 25 is preferably a hollow casting with a separately produced cap 25a secured to the free end thereof. An axially extending opening 26 freely receives the threaded end of the anchor member 18, and a nut 27 is arranged in alignment therewith. The nut is set within a straight-sided opening 28 such that it may not rotate with respect to the handle, and is staked in position as illustrated in Fig. 7. Alternatively, the left hand end of the handle 25 may be threaded to receive the threaded end of the anchor member 18.

A washer 29 is preferably arranged between the handle 25 and the arm 15 and encircling the anchor member 18. This washer is preferably U-shaped, with the legs thereof extending forwardly and overlying the legs of the U-shaped arm 15, all as clearly shown in Fig. 3. The washer serves as an intermediate member through which the handle 25 may bear against the arcuate surface 16 of the arm 15. It is of particular value where the arm 15 comprises a U-shaped sheet metal member as in the illustrated embodiment of the invention.

It will now be seen that with the blade 12 arranged loosely between the pins 11 and 21, the handle 25 along with the anchor member 18 may be raised and lowered with respect to the frame member 10 and the arm 15, and may be positioned with respect thereto anywhere between the two extreme positions illustrated in Figs. 1 and 2. Rotation of the handle in the proper direction will cause tensioning of the blade, with the handle and the blade in the desired position of adjustment. Separate locking means are provided for firmly locking the anchor member 18, and hence the blade and the handle, in adjusted position.

The locking means include a bolt 30 and a wing nut 31, the bolt extending through facing slots 32 in the legs of the U-shaped arm 15 and through a slot 33 (see Figs. 4 and 5) in the anchor member 18. As may be seen best in Fig. 6, the head of the bolt 30 engages the outer surface of one leg of the U-shaped arm 15, and the wing nut 31 engages the outer surface of the other leg of the arm. Accordingly, tightening of the wing nut 31 presses the legs of the arm 15 firmly against the flat sides 19 of the anchor member 18, whereby the anchor member may be firmly locked in adjusted position. A washer 34 is preferably arranged under the wing nut 31, and the shank of the bolt 30 preferably has a square portion 35 adjacent the head thereof such that the bolt may not rotate within the slots 33.

It should be noted that operation of the locking means is entirely independent of the tensioning of the blade since it operates in a direction perpendicular to the direction of blade tensioning. When the locking means is released, it does not in any way interfere with the tensioning of the blade since the slot 33 in the anchor member 18 is of sufficient length that the necessary longitudinal movement of the anchor member is permitted. In Fig. 5, the extreme blade tightening position of the anchor member 18 is illustrated in solid lines, the anchor member having been drawn to the right such that the bolt 30 is at the left hand end of the slot 33. If the handle 25 is then rotated in the direction indicated by the arrow in Fig. 5, the anchor member is let out and may move to the left to the position illustrated by phantom lines in Fig. 5, wherein the bolt 30 is at the right hand end of the slot 33. The indicated permissible movement of the anchor member 18 has been found to be sufficient to permit connection of the blade to the anchor member and tightening of the blade.

Preferably the slots 32 terminate short of the free ends of the legs of the arm 15 such that the anchor member 18 and associated parts may not move beyond the free end of the arm 15. These parts may, however, be disassembled by removal of the wing nut 31 and the bolt 30, as will be apparent to those skilled in the art.

The invention has been illustrated in a hack saw which is adapted to receive only one length of saw blade. It will be apparent, however, that the frame of the saw blade may be made extensible in various well known ways without in any way affecting the application of the invention. Also, the forward end of the saw blade 12 is illustrated as being pivoted about a fixed pin 11. If desired, this forward end of the blade may be adjustably positioned with respect to the frame of the saw in a conventional manner, again without affecting the application of the invention.

A hack saw has now been shown and described in which the blade is quickly and easily adjusted in position with respect to the frame thereof. The blade of this hack saw may be firmly locked in adjusted position without altering previous tensioning of the blade. As will be apparent to those skilled in the art, the hack saw which is shown in the drawings and described above is of durable construction, convenient to use and economical to manufacture.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a hack saw, an elongated frame member, means at one end of said frame member for pivotally anchoring one end of a hack saw blade, an arm extending laterally from the other end of said frame, said arm having an arcuate surface facing away from said anchoring means and extending generally circumferentially about the pivotal axis of said one end of said hack saw blade, an elongated blade anchor arranged for detachable connection to the other end of said blade, said blade anchor extending through a slot in said arm and beyond said arcuate surface thereof, said blade anchor being longitudinally movable within said slot to tighten said hack saw blade and laterally movable within said slot toward and away from said frame member, a handle threadedly engaging said blade anchor and bearing against said arcuate surface of said arm for tightening said hack saw blade in adjusted position with respect to said arm, and means for pressing the sides of said arm against said blade anchor to lock said blade anchor in adjusted position.

2. In a hack saw, an elongated frame member, means at one end of said frame member for pivotally anchoring one end of a hack saw blade, an arm extending laterally from the other end of said frame, said arm having an arcuate surface facing away from said anchoring means and extending generally circumferentially about the pivotal axis of said one end of said hack saw blade, an elongated blade anchor arranged for detachable connection to the other end of said blade, said blade anchor extending through a slot in said arm and having a threaded end extending beyond said arcuate surface thereof, said blade anchor being longitudinally movable within said slot to tighten said hack saw blade and laterally movable within said slot toward and away from said frame member, a handle threadedly receiving said threaded end of said blade anchor and bearing against said arcuate surface of said arm for tightening said hack saw blade in adjusted position with respect to said arm, and means for pressing the sides of said arm against said blade anchor to lock said blade anchor in adjusted position.

3. In a hack saw, an elongated frame member, means at one end of said frame member for pivotally anchoring one end of a hack saw blade, an arm extending laterally from the other end of said frame, said arm having an arcuate surface facing away from said anchoring means and extending generally circumferentially about the pivotal axis of said one end of said hack saw blade, an elongated blade anchor arranged for detachable connection at one end to the other end of said blade, said blade anchor extending through a first slot in said arm and having a threaded end extending beyond said arcuate surface thereof, said blade anchor being longitudinally movable within said slot to tighten said hack saw blade and laterally movable within said slot toward and away from said frame member, a handle threadedly receiving said threaded end of said blade anchor and bearing against said arcuate surface of said arm for tightening said hack saw blade in adjusted position, a threaded member extending through said blade anchor and through a second slot in said arm, said threaded member being arranged perpendicular to both said blade anchor and said arm and being movable within said second slot toward and away from said frame member with said blade anchor, said threaded member having a head bearing against one side of said arm, and a nut threadedly receiving said threaded member and bearing against the other side of said arm, said threaded member and said nut serving to press the sides of said arm against said blade anchor to lock said blade anchor in adjusted position with respect to said arm.

4. The combination as specified in claim 3 wherein said blade anchor has opposed, flat sides engaging the edges of said arm defining opposite sides of said first slot, whereby said blade anchor is prevented from rotation within said first slot.

5. The combination as specified in claim 3 wherein said elongated blade anchor is provided with a longitudinally extending slot for receiving said threaded member, whereby said blade anchor may move longitudinally of itself to effect tensioning of said blade while said threaded member remains stationary within said second slot.

6. The combination as specified in claim 3 wherein said arm comprises a U-shaped member of sheet metal secured to said frame member, the legs thereof defining a space therebetween comprising said first slot, said legs having facing, elongated openings therethrough comprising said second slot.

7. The combination as specified in claim 6 wherein the bail of said U-shaped arm extends around and is secured to said frame member, and said openings in said legs comprising said second slot terminate short of the free ends of said legs.

8. The combination as specified in claim 6 wherein a U-shaped washer is provided intermediate said handle and said arm and encircling said blade anchor, the legs of said U-shaped washer overlying the legs of said U-shaped arm.

References Cited in the file of this patent
UNITED STATES PATENTS

| | | |
|---|---|---|
| 1,245,545 | Williams | Nov. 6, 1917 |
| 1,540,201 | Voltz | June 2, 1925 |
| 1,835,638 | Cunneen | Dec. 8, 1931 |
| 2,514,880 | Leatherman | July 11, 1950 |
| 2,556,093 | Leatherman | June 5, 1951 |
| 2,771,925 | Littman | Nov. 27, 1956 |